US012764729B2

(12) United States Patent
Harada et al.

(10) Patent No.: US 12,764,729 B2
(45) Date of Patent: Oct. 13, 2026

(54) TERMINAL, BASE STATION, AND COMMUNICATION METHOD WITH CONFIGURABLE ALLOCATION OF BANDWIDTH RESOURCES

(71) Applicant: NTT DOCOMO, INC., Tokyo (JP)

(72) Inventors: Hiroki Harada, Tokyo (JP); Satoshi Nagata, Tokyo (JP); Daisuke Kurita, Tokyo (JP); Naoya Shibaike, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 342 days.

(21) Appl. No.: 18/273,482

(22) PCT Filed: Jan. 22, 2021

(86) PCT No.: PCT/JP2021/002350
§ 371 (c)(1),
(2) Date: Jul. 20, 2023

(87) PCT Pub. No.: WO2022/157953
PCT Pub. Date: Jul. 28, 2022

(65) Prior Publication Data
US 2024/0323940 A1 Sep. 26, 2024

(51) Int. Cl.
*H04W 72/0457* (2023.01)
*H04W 72/231* (2023.01)
*H04W 72/51* (2023.01)

(52) U.S. Cl.
CPC ..... *H04W 72/0457* (2023.01); *H04W 72/231* (2023.01); *H04W 72/51* (2023.01)

(58) Field of Classification Search
CPC ............ H04W 72/0457; H04W 72/51; H04W 72/231
See application file for complete search history.

(56) References Cited

U.S. PATENT DOCUMENTS 10,299,260 B2 5/2019 Rico Alvarino et al.
2011/0103272 A1* 5/2011 Dai ..................... H04W 72/23 370/328
2016/0345118 A1* 11/2016 Oh ..................... H04B 1/713
2018/0139725 A1* 5/2018 Takeda ................. H04W 72/23
2019/0182715 A1* 6/2019 Urabayashi ........... H04L 5/0092
2020/0059904 A1 2/2020 Takeda et al.
2020/0137731 A1* 4/2020 Wei ................... H04W 72/0453
2020/0187170 A1* 6/2020 Shin .................... H04L 27/2666
2022/0210867 A1* 6/2022 Bergström ............ H04L 1/1829
2022/0225371 A1* 7/2022 Seo ..................... H04L 5/001
(Continued)

FOREIGN PATENT DOCUMENTS

EP 3731582 A1 10/2020

OTHER PUBLICATIONS

Extended European Search Report issued in Application No. 21921061.4, mailed Sep. 24, 2024 (8 pages).
(Continued)

*Primary Examiner* — Jael M Ulysse
(74) *Attorney, Agent, or Firm* — Osha Bergman Watanabe & Burton LLP

(57) ABSTRACT

A terminal configures bandwidth resources narrower than a normal minimum unit when specific condition is met or specific notification is received. The terminal performs reception operation including monitoring on the bandwidth resources configured.

13 Claims, 7 Drawing Sheets

(56) References Cited

U.S. PATENT DOCUMENTS

| | | | | |
|---|---|---|---|---|
| 2023/0180203 | A1* | 6/2023 | Wen | H04L 27/26025 370/329 |
| 2023/0216632 | A1* | 7/2023 | Go | H04L 5/0048 370/329 |
| 2023/0224883 | A1* | 7/2023 | Agarwal | H04W 72/0457 370/329 |
| 2023/0254836 | A1* | 8/2023 | Jia | H04L 5/0094 370/329 |
| 2024/0049270 | A1* | 2/2024 | Su | H04W 72/53 |
| 2024/0365372 | A1* | 10/2024 | Fujishiro | H04W 4/70 |
| 2024/0421968 | A1* | 12/2024 | Moon | H04L 5/0094 |

OTHER PUBLICATIONS

Notice of Reasons for Refusal issued in Japanese Application No. 2022-576924, mailed Sep. 24, 2024 (8 pages).

International Search Report issued in PCT/JP2021/002350 on Aug. 24, 2021 (2 pages).

Written Opinion of the International Searching Authority issued in in PCT/JP2021/002350 on Aug. 24, 2021 (3 pages).

3GPP TS 38.211 V15.8.0; "3rd Generation Partnership Project; Technical Specification Group Radio Access Network; NR; Physical channels and modulation (Release 15)"; Dec. 2019 (97 pages).

* cited by examiner

CONVENTIONAL MODEL

B5G/6G

TERMINAL, BASE STATION, AND COMMUNICATION METHOD WITH CONFIGURABLE ALLOCATION OF BANDWIDTH RESOURCES

TECHNICAL FIELD

This disclosure relates to a terminal, a base station and a communication method that perform radio communication.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

Potential topics for consideration for Beyond 5G and 6G include the development of new frequency bands (100 GHz or higher frequency band, terahertz band, etc.), further speed-up in the existing 5G frequency band (100 GHz or less) (Examples: Narrow beam, coordinated transmission/reception between base stations, coordinated transmission/reception between terminals, etc.), and the reduction of power consumption in mobile terminals and mobile base stations, and the realization of long term uncharged use.

Then, if the achievable data rate increases due to the use of high-frequency bands, broadband and multi-streams, etc., it is assumed that communication may be completed in a short period of time and many other times may be idle, which would contribute to the reduction of power consumption of the terminal.

On the other hand, although the 3GPP Release 15 (NR) specifications specify radio frames, subframes, slots, etc. (non-patent document 1), even when data are not being transmitted or received, PDCCH (Physical Downlink Control CHannel) monitoring, time-frequency tracking, AGC (Automatic Gain Control), and CSI (Channel-state Control) measurement reporting (Connected mode only) are performed by DRX (Discontinuous Reception), and the wider the bandwidth for monitoring PDCCH or RS (Reference Signal) and the shorter the time interval (period) for monitoring, the greater power consumption.

CITATION LIST

Non-Patent Literature

[Non-Patent Literature 1]
3GPP TS 38.211 V 15.8.0, 3rd Generation Partnership Project; Technical Specification Group Radio Access Network; NR; Physical channels and modulation (Release 15), 3GPP, December 2019

SUMMARY OF INVENTION

However, in 5G NR, the resource that monitors PDCCH is set as CORESET, and narrowing this bandwidth reduces the capacity of PDCCH.

In Release 16 (NR), in Power saving WI (Work Item), the Wake up feature using group common PDCCH (DCI format 2_6) can instruct the UE to skip PDCCH monitoring during DRX on-duration, but in NR, PDCCH has a bandwidth of at least 1 CCE (Control Channel Element)=6 REG (Resource Element Group)=72 subcarrier, so there is still room for improvement.

Therefore, the following disclosure has been made in view of these circumstances, and the purpose of the disclosure is to provide terminals, base stations, and communication methods that can suppress terminal power consumption and achieve long standby time by enabling monitoring operations at a much lower power consumption than in the past.

One aspect of the disclosure is a terminal (UE 200) including a control unit (control unit 240) that configures bandwidth resources narrower than a normal minimum unit when specific condition is met or specific notification is received, and a reception unit (radio communication unit 210) that performs reception operation including monitoring on the bandwidth resources configured.

One aspect of the disclosure is a base station (base station 100) including a control unit (control unit 140) that allocates bandwidth resources narrower than a normal minimum unit to a terminal, and a transmission unit (radio communication unit 110) that transmits a notification related to allocation of the narrower bandwidth resources to the terminal.

In addition, one aspect of the disclosure is a communication method of a terminal (UE 200), including the steps of configuring bandwidth resources narrower than a normal minimum unit when specific condition is met or specific notification is received, and performing reception operations including monitoring on the bandwidth resources configured.

In addition, one aspect of the disclosure is a communication method a base station (base station 100), including the steps of allocating bandwidth resources narrower than a normal minimum unit to a terminal (UE 200) and transmitting a notification related to allocation of the narrower bandwidth resources to the terminal.

MODES FOR CARRYING OUT THE INVENTION

Figure 1:
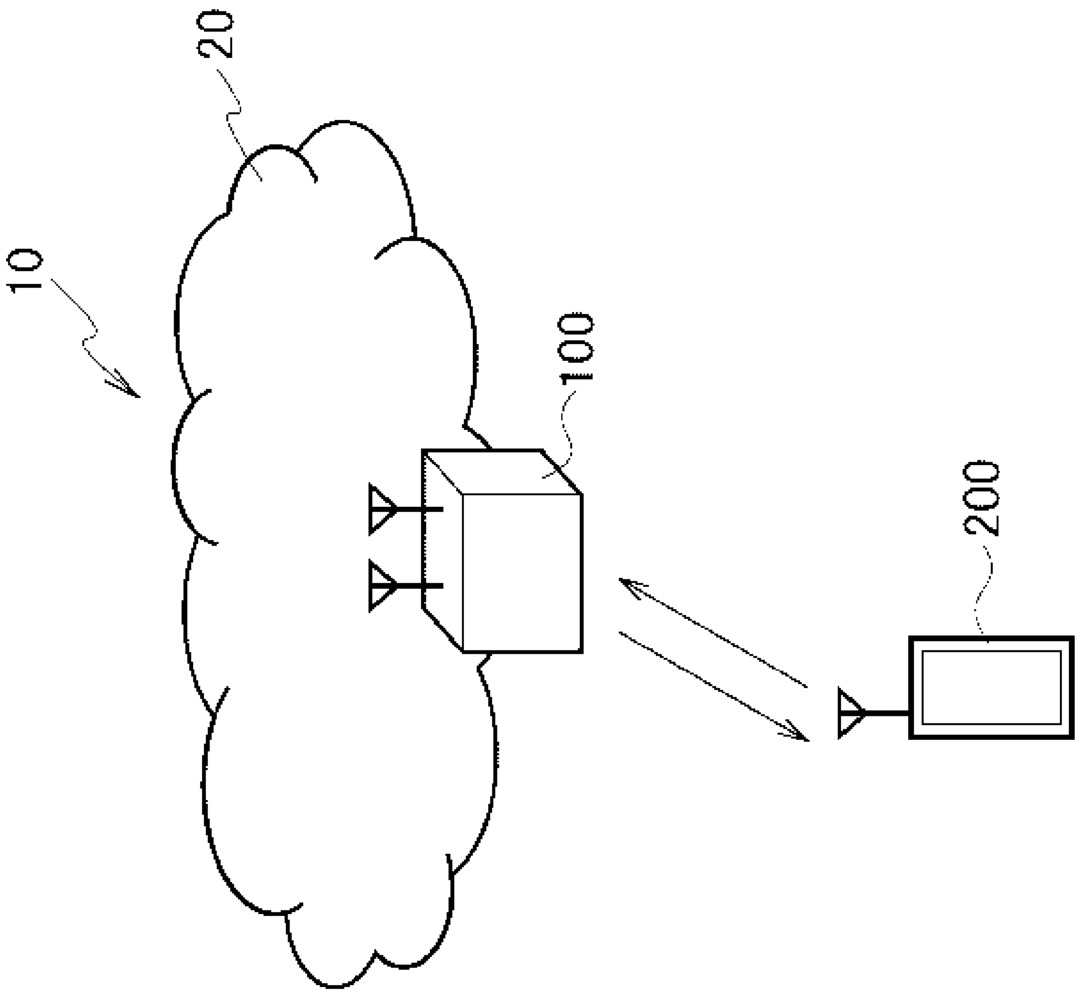
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

FIG. 1 is an overall schematic configuration of a radio communication system 10 according to this embodiment. The radio communication system 10 is a radio communication system according to 5G New Radio (NR) or 6G (may be referred to as Beyond 5G) and includes the Next Generation-Radio Access Network 20 (NG-RAN 20), and Terminal 200 (Below, UE 200, User Equipment).

The NG-RAN 20 includes a radio base station 100 (henceforth gNB 100 or base station 100). The specific configuration of the radio communication system 10 including the number of gNBs and UEs is not limited to the example shown in FIG. 1.

The NG-RAN 20 actually includes multiple NG-RAN nodes, specifically, gNBs (or ng-eNBs), and is connected to a core network (5GC, 6GC not shown) according to 5G or 6 G. Note that the NG-RAN 20 and 5GC or 6GC may simply be described as a network.

The gNB 100 is a radio base station according to 5G or 6 G, and performs radio communication according to UE 200 and 5G/6G. The gNB 100 and UE 200 are capable of supporting Massive MIMO (Multiple-Input Multiple-Output) which generates a more directional beam by controlling radio signals transmitted from multiple antenna elements, carrier aggregation (CA) which uses multiple component carriers (CCs) bundled together, dual connectivity (DC) which simultaneously communicates between the UE and each of the two NG-RAN nodes, and Integrated Access and Backhaul (IAB) which integrates radio backhaul between radio communication nodes such as the gNB and radio access to the UE.

The radio communication system 10 corresponds to FR1 and FR2. The frequency bands of each FR are as follows:

FR 1: 410 MHz to 7.125 GHz

FR 2: 24.25 GHz to 52.6 GHZ

FR 1 uses sub-carrier spacing (SCS) of 15, 30 or 60 kHz and may use a bandwidth (BW) of 5~100 MHz. FR 2 is a higher frequency than FR 1 and an SCS of 60 or 120 kHz (240 kHz may be included) may be used and a bandwidth (BW) of 50~400 MHz may be used.

In addition, a new frequency band (Examples: 100 GHz or higher frequency band, terahertz band) for 6 G may be used. Specifically, the radio communication system 10 may support frequency bands above 52.6 GHz and up to 114.25 GHz. SCS may be interpreted as numerology. Numerology is defined in 3 GPP TS 38.300 and corresponds to one subcarrier spacing in the frequency domain. The high frequency band may be further segmented. For example, it may be segmented into a frequency range below 71 GHz and a frequency range above 71 GHz. Especially in such a high frequency band, the increase in phase noise between carriers becomes a problem. Thus, the application of a larger (wider) SCS, or single-carrier waveform, may be required.

The DC type may be Multi-RAT Dual Connectivity (MR-DC), which utilizes multiple radio access technologies, or NR-NR Dual Connectivity (NR-DC), which utilizes only NR. MR-DC may also be E-UTRA-NR Dual Connectivity (EN-DC), in which the eNB constitutes the master node (MN) and the gNB constitutes the secondary node (SN), or vice versa, NR-E-UTRA Dual Connectivity (NE-DC).

In DC, a master cell group (MCG) and a secondary cell group (SCG) may be set. The MCG may include a primary cell (PCell) and the SCG may include a secondary cell (SCell).

The SCell may also include a primary secondary cell (PSCell). A PSCell is a type of SCell, but may be interpreted as a special SCell that has an equivalent function to PCell. Like PCell, PSCell may transmit PUCCH (Physical Uplink Control Channel, Uplink Control Channel), perform contention-based random access procedures (CBRA), and perform radio link monitoring functions.

(2) Function Block Configuration of Radio Communication System

Figure 2:
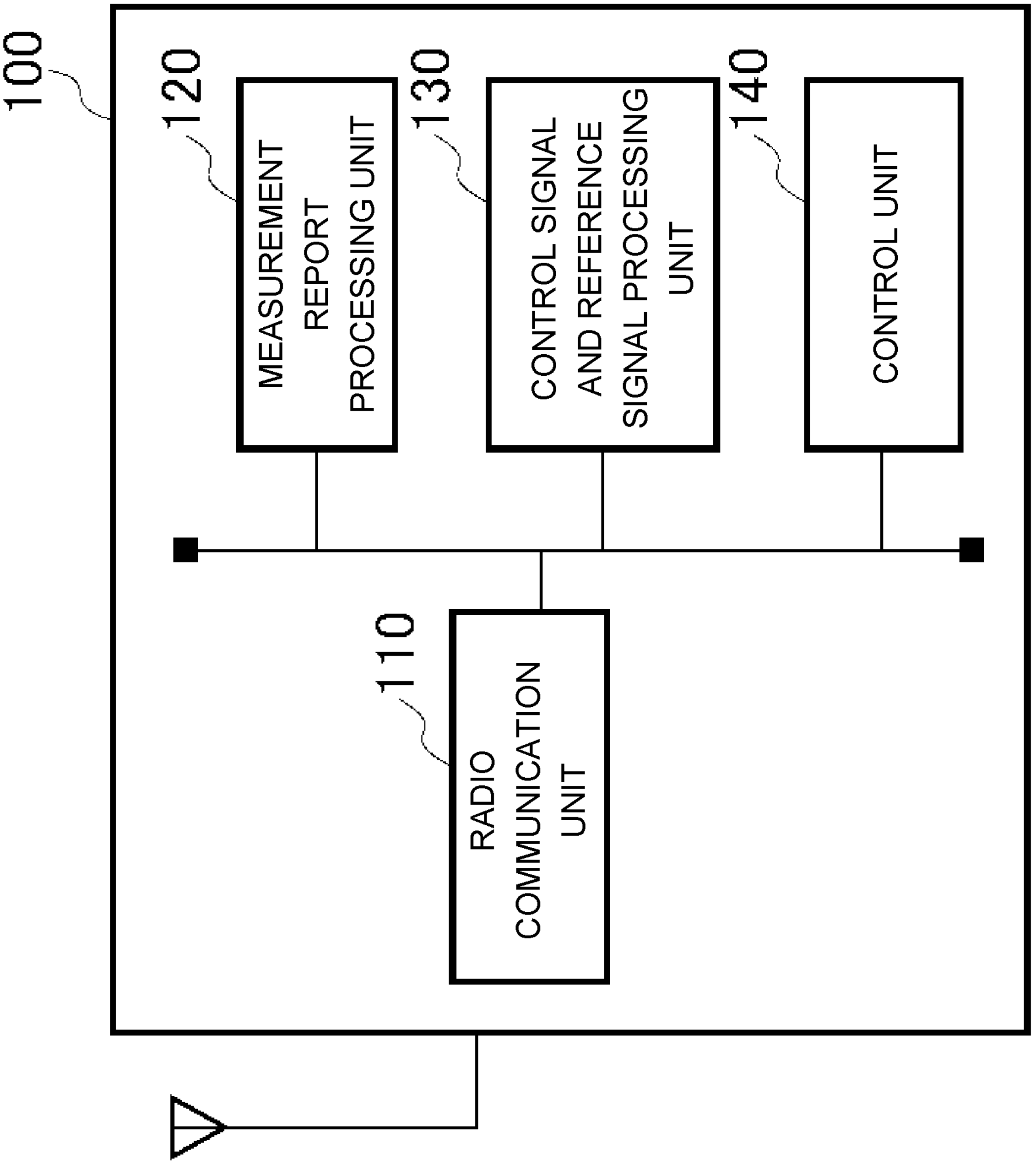
FIG. 2 is a schematic functional block diagram of a gNB 100.
Figure 3:
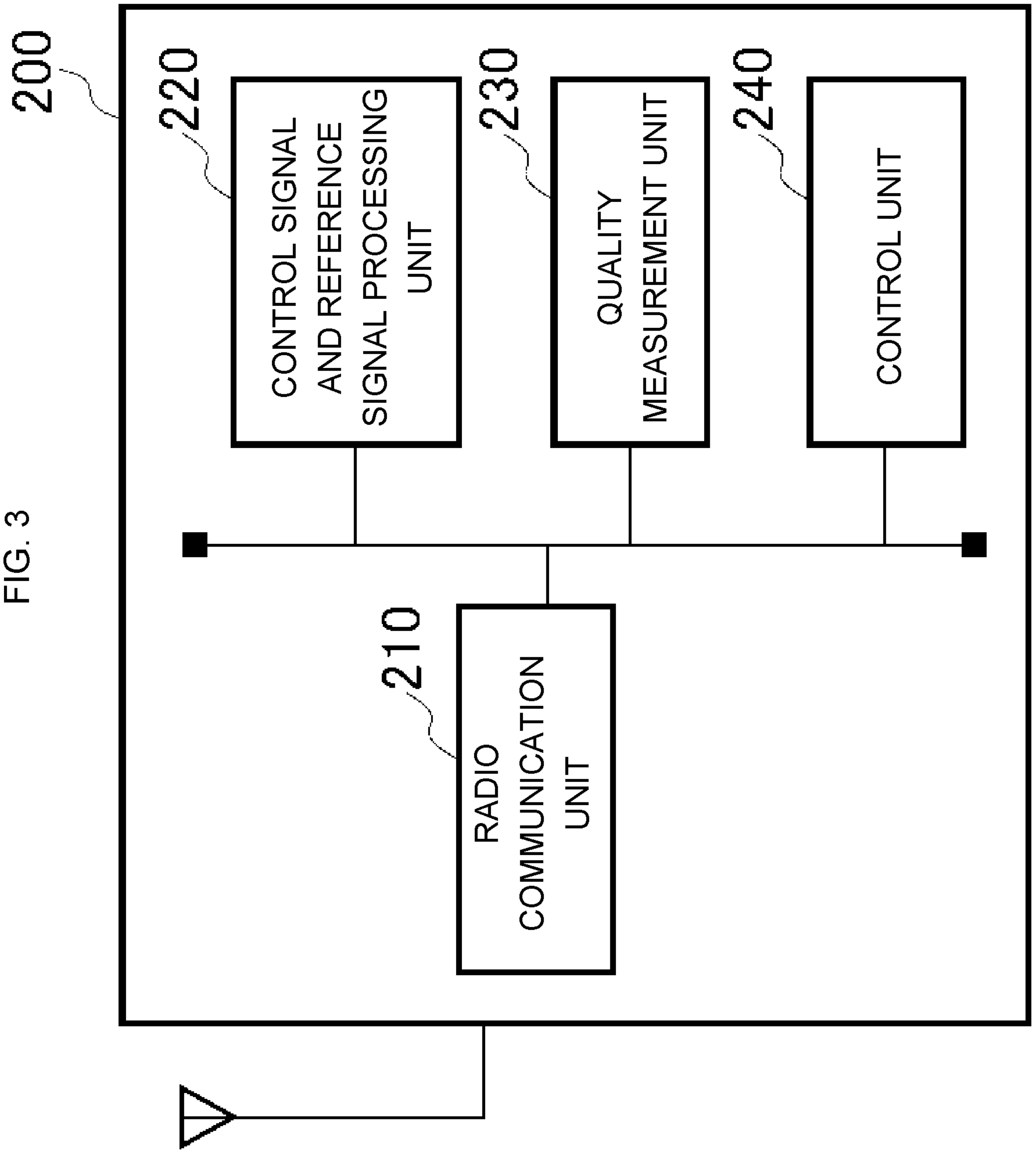
FIG. 3 is a schematic functional block diagram of a UE 200.

Next, the functional block configuration of the radio communication system 10 is described. Specifically, the functional block configuration of the gNB 100 and the UE 200 is described. FIG. 2 is a schematic functional block configuration diagram of the gNB 100, and FIG. 3 is a schematic functional block configuration diagram of the UE 200.

(2.1) Radio Base Station 100

FIG. 2 is a functional block diagram of the radio base station 100. As shown in FIG. 3, the radio base station 100 includes a radio communication unit 110, a measurement report processing unit 120, a control signal and reference signal processing unit 130 and a control unit 140.

The radio communication unit 110 transmits and receives radio signals in accordance with 5G or 6G. Specifically, the radio communication unit 110 transmits a downlink signal (DL signal) in accordance with 5G/6G and receives an uplink signal (UL signal) in accordance with 5G/6G.

In particular, in the present embodiment, the radio communication unit 110 may constitute a transmission unit that transmits a notification regarding bandwidth resource allocation to the UE 200 terminal. The radio communication unit 110 may also transmit a reference signal or the like to the UE 200 in the allocated band. The radio communication unit 110 may also receive measurement reports such as radio quality based on reference signals from the UE 200.

In response to dual connectivity, the radio communication unit 110 may transmit and receive radio signals through cells included in cell groups, specifically MCG (master cell group) and/or SCG (secondary cell group).

The measurement report processing unit 120 executes processing related to the measurement report transmitted from the UE 200. As a specific example, the measurement report processing unit 120 may execute processing related to the measurement report by the UE 200, including the reception quality of the reference signal or the like in a band narrower than the normal minimum unit (Hereafter referred to as "ultra-narrow band"). In this embodiment, the radio communication unit 110 may constitute a reception unit that receives measurement reports from a terminal.

The reception quality may include at least one of RSRP (Reference Signal Received Power), RSRQ (Reference Signal Received Quality) and SINR (Signal-to-Interference plus Noise power Ratio).

The control signal and reference signal processing unit 130 performs processing related to various control signals transmitted and received by the radio communication unit 110 and processing related to various reference signals transmitted and received by the radio communication unit 110.

Specifically, the control signal and reference signal processing unit 130 receives various control signals transmitted from the radio communication unit 110 via a predetermined control channel, for example, control signals of a radio resource control layer (RRC). The control signal and reference signal processing unit 130 also transmits various control signals toward the radio communication unit 110 via a predetermined control channel. In particular, in this embodiment, the control signal and reference signal processing unit

130 can receive the UE Capability Information of the UE 200 from the UE 200. In this embodiment, the control signal and reference signal processing unit 130 may constitute a reception unit that receives the capability information from the UE 200.

The capability information may include at least the capability related to the band, for example, information related to the frequency band to which the UE 200 can be connected and the capability of configuring the band resources (for example, the capability corresponding to the ultra-narrow band). It should be noted that the capability information is not limited to the capability related to the band of such a UE 200, but may include the capability related to, for example, the transmission power, the transmission beam, the antenna, etc.

The channel may include a control channel and a data channel. The control channel may include a PDCCH (Physical Downlink Control Channel), a PUCCH (Physical Uplink Control Channel), a RACH (Downlink Control Information (DCI) including Random Access Channel, Random Access Radio Network Temporary Identifier (RA-RNTI)), and a Physical Broadcast Channel (PBCH).

The data channel may also include a PDSCH (Physical Downlink Shared Channel), and a PUSCH (Physical Uplink Shared Channel). Data may mean data transmitted through a data channel.

The control signal and reference signal processing unit 130 performs processing using a reference signal (RS) such as a Demodulation Reference Signal (DMRS) and a Channel State Information-Reference Signal (CSI-RS).

DMRS is a known reference signal (pilot signal) between individual base stations and terminals for estimating a fading channel used for data demodulation. CSI-RS is a downlink reference signal for channel state measurement.

In addition to DMRS and CSI-RS, the reference signal may include a Phase Tracking Reference Signal (PTRS), a Sounding Reference Signal (SRS), and a Positioning Reference Signal (PRS) for location information. That is, the reference signal transmitted by the radio base station 100 and the reference signal (received by the radio base station 100) transmitted by the UE 200 may be included.

In this way, the control signal and reference signal processing unit 130 can transmit and receive the reference signal with the UE 200. In this embodiment, control signal and reference signal processing unit 130 may constitute a transmission/reception unit that transmits and receives the reference signal.

The control unit 140 controls each functional block that constitutes the radio base station 100. Specifically, in this embodiment, the control unit 140 allocates resources to the UE 200 in terms of bandwidth and time, including a bandwidth narrower than the usual minimum unit (ultra-narrow bandwidth). For example, the control unit 140 determines the number of resource blocks (RBs) (While it is usually one or several resource blocks, especially in this embodiment, it may be less than one resource block or it may be one or several subcarrier resources), transport block size (TBS), modulation method, etc. to be allocated to the user device 300.

The control unit 140 is not limited to allocating one ultra-narrow band resource for each UE 200, but may allocate resources for each cell, beam, cell group (CG), or for some specific cells.

The control unit 140 may also allocate more resources in the time direction than the normal minimum resource allocation unit (e.g., 1 symbol). For example, a symbol length different from the SCS symbol length supported by the UE 200 (e.g., a longer symbol length) may be allocated, or the number of symbols greater than 1 may be the minimum resource allocation unit in the time direction.

It should be noted that the control unit 140 may allocate ultra-narrow band resources for specific applications (such as monitoring), when certain conditions such as DRX state and IDLE state are met. Conversely, the control unit 140 may allocate wider band resources than ultra-narrow band resources for specific applications (such as data communication), when other specific conditions such as non-DRX state and non-IDLE state are met. It should be noted that the control unit 140 may allocate ultra-narrow band resources only when it receives capability information from the UE 200 or the like indicating that ultra-narrow band resources can be used as a prerequisite.

In addition, the control unit 140 may allocate resources to each of the multiple UEs 200 as either TDM (time division multiplexing), FDM (frequency division multiplexing), CDM (code division multiplexing), SDM (space division multiplexing), or a combination, and may allocate resources so that they can be shared among the multiple UEs 200. For example, resources may be allocated to the UE common in a cell, to the UE common in the same base station beam, or to the UE common in a UE group set by the base station.

The control unit 140 may estimate the position, direction, etc. of the UE 200 based on the measurement report received from the UE 200. This allows, for example, control unit 140 to select and transmit a beam with better reception quality for the UE 200.

(2.2) UE 200

Figure 4:
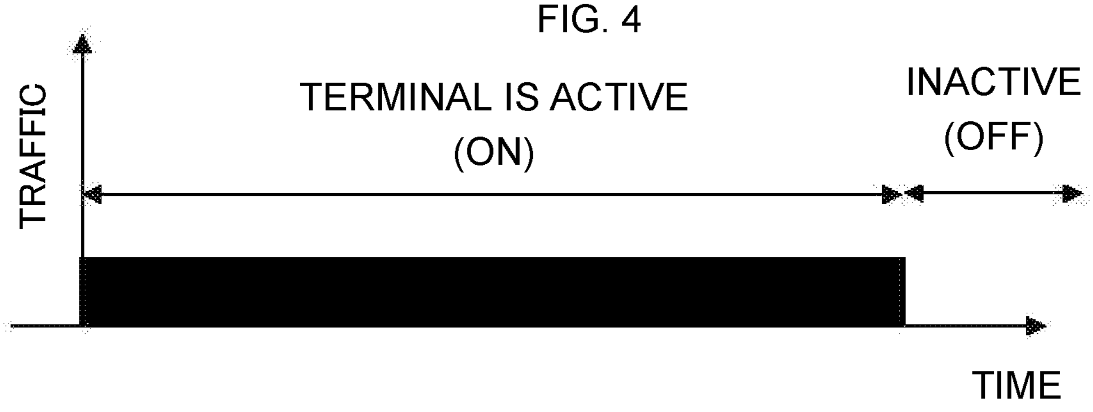
FIG. 4 shows the difference between conventional communication and B5G (Beyond 5G)/6G communication.
Figure 4:
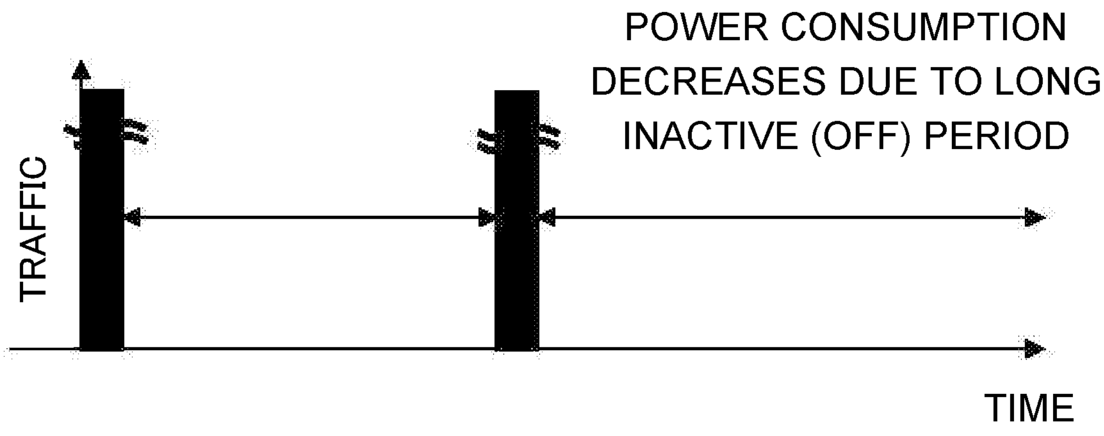

FIG. 3 is a functional block diagram of the UE 200. As shown in FIG. 4, the UE 200 includes a radio communication unit 210, a control signal and reference signal processing unit 220, a quality measurement unit 230 and a control unit 240.

The radio communication unit 210 transmits and receives radio signals in accordance with 5G or 6G. Specifically, the radio communication unit 210 transmits an uplink signal (UL signal) in accordance with 5G/6G and receives a downlink signal (DL signal) in accordance with 5G/6G.

In the present embodiment, the radio communication unit 210 may be configured as a reception unit that receives a notification from the base station 100 or as a transmission unit that transmits capability information to the base station regarding the configuring capability of bandwidth resources such as ultra-narrow bandwidth. The radio communication unit 210 may be configured as a transmission/reception unit that performs reception and/or transmission operations for applications including monitoring on the bandwidth resources set by control unit 240.

The radio communication unit 210 can support Massive MIMO, CA using multiple CCs bundled together, and DC that simultaneously communicates between the UE and each of the 2 RAN nodes.

The control signal and reference signal processing unit 220 performs processing related to various control signals transmitted and received by the UE 200, and processing related to various reference signals transmitted and received by the UE 200. The control signal or reference signal processed by control signal and reference signal processing unit 220 is transmitted and received via the radio communication unit 210. Therefore, the control signal and reference signal processing unit 220 can monitor the reference signal and the like with the band resources set by the control unit 240.

As a specific example, the control signal and reference signal processing unit 220 receives various control signals transmitted from the radio base station 100 via a predetermined control channel, such as control signals of the radio resource control layer (RRC). The control signal and reference signal processing unit 220 also transmits various control signals toward the radio base station 100 via a predetermined control channel.

The control signal and reference signal processing unit 220 performs processing using reference signals (RS) such as DMRS and PTRS. DMRS is a known reference signal (pilot signal) between individual base stations and terminals for estimating the fading channel used for data demodulation. PTRS is a reference signal for individual terminals for estimating phase noise, which is a problem in high frequency bands.

In addition to DMRS and PTRS, the reference signal may include Channel State Information-Reference Signal (CSI-RS), Sounding Reference Signal (SRS), and Positioning Reference Signal (PRS) for location information.

The control signal and reference signal processing unit 220 can also perform actions on the UE 200's capability information. For example, control signal and reference signal processing unit 220 can transmit the UE Capability Information in response to the UE Capability Inquiry from the radio base station 100.

The quality measurement unit 230 measures radio quality or the like based on the reference signal or the like from the base station 200. Since the reference signal or the like can be obtained in the band resource set by control unit 240 as described above, the quality measurement unit 230 can perform monitoring in the set band.

As a specific example, the quality measurement unit 230 can measure the reception quality using a synchronous signal block (SSB: SS/PBCH Block) or CSI-RS. The reception quality may include at least one of RSRP, RSRQ and SINR as described above. The quality measurement unit 230 may measure the reception quality of the serving cell or the surrounding cell of the UE 200.

RSRP is the reception level of the reference signal measured at the UE 200 and RSRQ is the reception quality (may be interpreted as the ratio of the power of the cell-specific reference signal to the total power in the received bandwidth) of the reference signal measured at the UE 200.

SSB measurements may use a measurement window called the SSB based RRM Measurement Timing Configuration (SMTC), which can be set for each carrier (or subcarrier). Specifically, the SMTC window may be interpreted as a measurement window set for the UE 200 allocated as a resource from the network (radio base station 100) because the UE 200 recognizes the measurement start timing, measurement period and measurement period for each cell to be measured when the UE 200 performs reception quality measurements using SSB.

The control unit 240 controls each functional block that constitutes the UE 200. Specifically, in this embodiment, more specifically, the control unit 240 sets resources such as ultra-narrow band resources when a specific condition is met or when a specific notification is received. For example, the specific notification is a notification about resource allocation such as ultra-narrow band resources received from the base station 100. It should be noted that the control unit 240 may switch from the set ultra-narrow band resources to wide band resources and reconfigure the resources when other conditions are satisfied or when other specific notification is received. Specific examples of specific conditions will be discussed later.

In addition, the control unit 240 may execute controls related to transmission of UE Capability Information by control signal and reference signal processing unit 220, transmission and reception of reference signals, and measurement of reception quality (RSRP, RSRQ and SINR) by the quality measurement unit 230.

(3) Operation of Radio Communication System

Next, the operation of radio communication system 10 will be described. Specifically, the operation of the base station 100 and the UE 200 will be described.

(3.1) Assumptions

In 5G Evolution or 6G, etc., the use of a wide bandwidth or multiple streams in a high frequency band is assumed. Here, FIG. 4 shows the difference between conventional communication and B5G (Beyond 5G)/6G communication.

As shown in FIG. 4, in B5G (Beyond 5G)/6G, when the data rate is increased due to the use of high frequency bands, broadband and multi-streams, etc., communication may be completed in a short time and many other times may become inactive (OFF) communication. Therefore, power consumption with long waiting time becomes a problem.

Also, the wider the bandwidth for monitoring a reference signal such as PDCCH or RS and the shorter the time interval for monitoring, the more power consumption increases. Here, FIG. 5 shows the relationship between the DRX state/Active state and monitoring in Release-16 NR.

Figure 5:
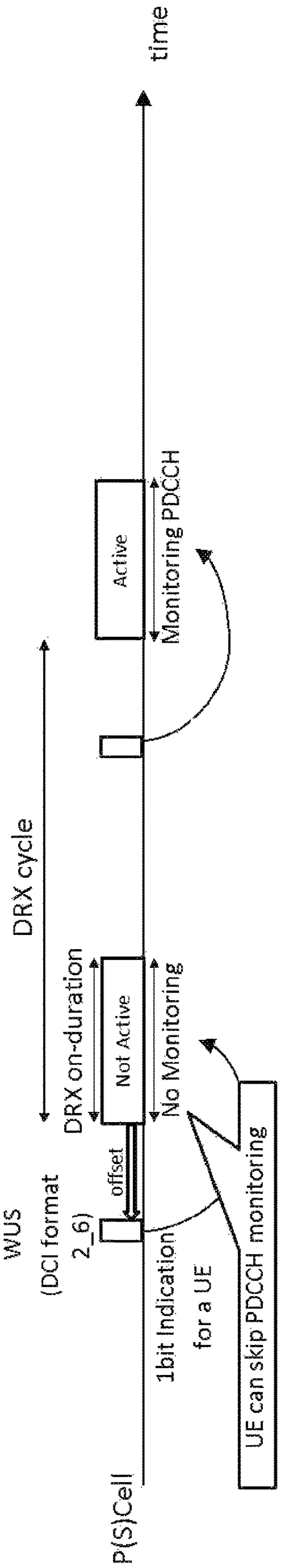
FIG. 5 shows the relationship between DRX state/Active state and monitoring in Release-16 NR.

As shown in FIG. 5, in Release 16 NR, in the power saving WI, the Wake up function using group common PDCCH (DCI format 2_6) enables the UE to be instructed to skip PDCCH monitoring in DRX on-duration. However, conventionally, in NR, PDCCH has a band of at least 1 CCE (6 REG=72 subcarriers).

An example of monitoring operation in a band smaller than the usual minimum unit (ultra-narrow band) according to the present embodiment will be described below.

(3.2) Overview of Operation

Figure 6:
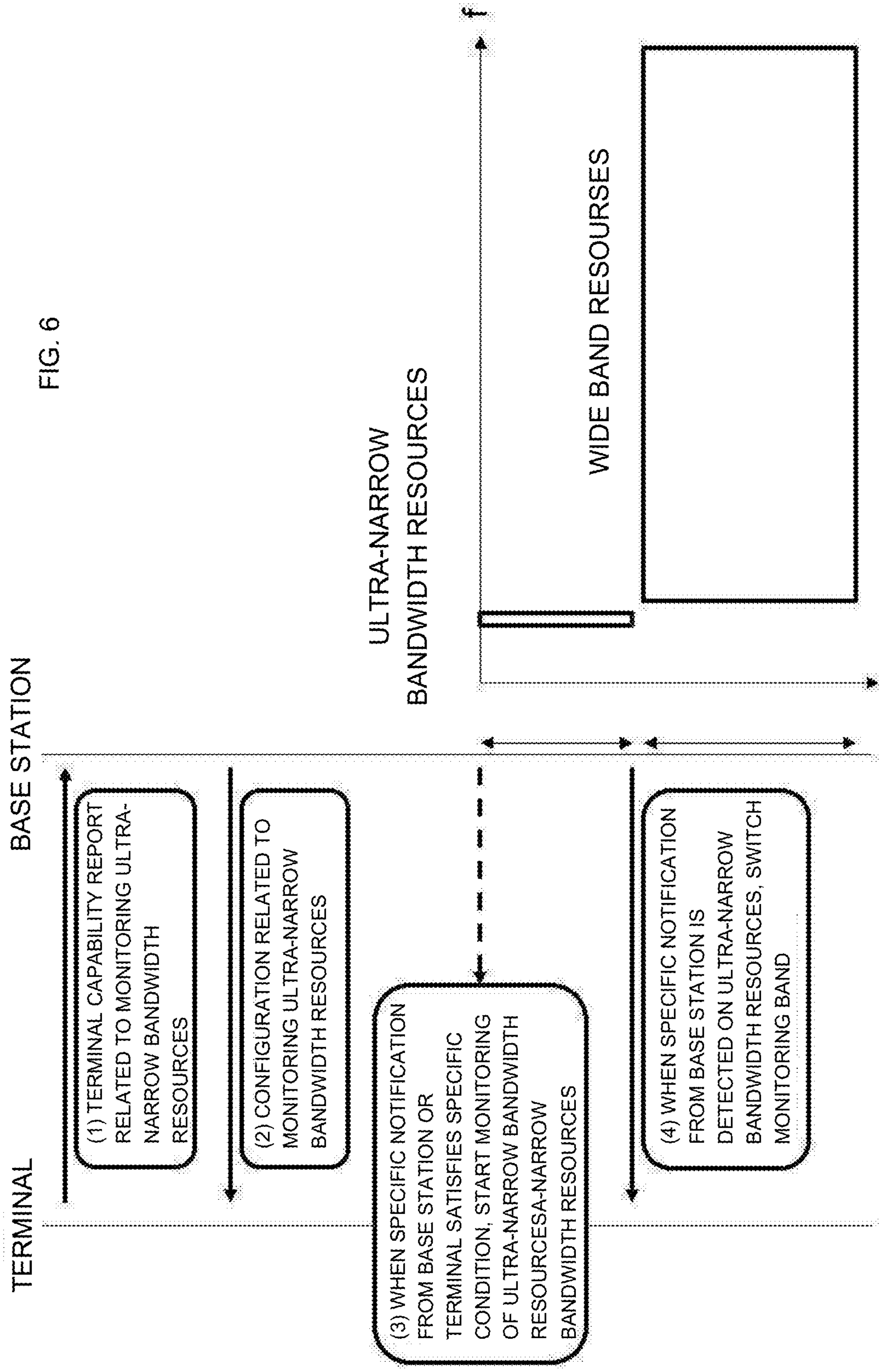
FIG. 6 shows an example of the operation of the base station 100 and the UE 200 in this embodiment.

FIG. 6 shows an example of operation of the base station 100 and the UE 200 in this embodiment.

As shown in FIG. 6, (1) First, the UE 200 sends capability information to the base station 100 to report on the capability of the terminal for monitoring ultra-narrow band resources.

(2) Then, when the base station 100 receives capability information from the UE 200 indicating that ultra-narrow band resources can be monitored, it sends a notification to the UE 200 instructing the UE 200 to allocate ultra-narrow band resources and to perform monitoring with the allocated ultra-narrow band resources.

(3) When a specific condition is satisfied, such as when receiving the above notification from the base station 100, the UE 200 sets the ultra-narrow band resources and starts monitoring.

(4) The base station 100 then sends a notification to the UE 200 instructing it to perform communication, such as monitoring, in a band wider than the ultra-narrow band resources in the case of non-DRX status, non-IDLE status or Active status. When a specific condition is satisfied, such as when the notification is received, the UE 200 switches the band from the ultra-narrow band to perform communication, such as monitoring.

The above is an example of the operation of the base station 100 and the UE 200 in this embodiment. In addition to/or in place of the above, the base station 100 and the UE 200 may perform the following operations.

(3.3) Operation Example 1

(Operation Example 1) For example, it may be possible to allocate resources in an ultra-narrow band of less than 1 RB (e.g., 1 subcarrier) from a base station 100 to a UE 200 terminal.

(Operation example 1-1) Narrowband resource allocation may be limited to specific applications, rather than the minimum resource allocation unit (1 RB or 1 CCE) of a normal data channel or control channel.

(Operation example 1-2) Ultra-narrowband resource allocation may be set for each UE by RRC signaling, for each cell by SIB or the like, or for each beam (SSB index or CSI-RS resource index).

(Operation example 1-2-1) Ultra-narrowband resource configuration information may include at least one of frequency start position, frequency resource amount (bandwidth), time resource start position (period and timing), and time resource amount (symbol or number of slots).

(Operation example 1-2-2) The resource monitored by the terminal (UE 200) may be derived solely on the basis of explicit configuration information, as described above, or may be derived on the basis of a combination of explicit configuration information described above and content specified in the specification (implicit information).

(Operation example 1-3) The ultra-narrow band resource may be assumed to be allocated more than the minimum resource allocation unit (one symbol) of the data channel or control channel in the time direction.

(Operation example 1-4) Only one ultra-narrow band resource (For example, Pcell only, PSCell only, specific SCell only, only one independent of the per-cell configuration) may be set for the UE, or multiple resources may be set for the UE, such as per CG or per (some) cells.

(3.4) Operation Example 2

(Example 2) When receiving a specific notification #1 from a base station 100 or when certain conditions are satisfied, a terminal (UE 200) configured with ultra-narrow band resources sets the monitoring band to only ultra-narrow band resources and monitors the presence or absence of a specific notification #2 from the base station 100 on that band.

(Example 2-1) The terminal 200 may assume at least one of the following as a specific notification #2 from the base station 100 and perform monitoring.

(Example 2-1-1) Transmission of a known modulated symbol sequence (known sequence) of a specific pattern on an ultra-narrow band resource (Example 2-1-2) Presence and content of a predetermined size information symbol sequence transmitted by differential modulation on an ultra-narrow band resource (Example 2-1-3) Presence and content of a predetermined size information symbol sequence transmitted on an ultra-narrow band resource (Example 2-2) The terminal 200 may assume a reference signal for synchronization other than “specific notification #2” from the base station 100.

(Example 2-3) One may assume at least one of the following as “specific notification #1” or “specific condition”:

(Example 2-3-1) When the conditions specified in the specifications are satisfied, such as when no instruction to send or receive data is received for a specified period of time (Example 2-3-2) When the specified conditions set by the base station are satisfied (Example 2-3-3) When instructions to enter the DRX state are received or conditions are satisfied (Example 2-3-4) When specific instructions are received or conditions are satisfied after entering the DRX state (Example 2-3-5) When entering the IDLE state (3.5) Operation Example 3

(Example 3) The terminal (UE 200) that detects a specific notification #2 ((3) in FIG. 6) switches the monitoring band to a band wider than the ultra-narrow band and performs monitoring operation on at least one of the other notification/reference signals.

(Operation example 3-1) At least either the minimum delay time or the maximum delay time required for switching the monitoring band (until at least one of the other notification/reference signals can be monitored in the band after switching) may be specified.

(Operation example 3-1-1) The delay time may include at least either the frequency retuning time or the BWP (Bandwidth Part) switching time.

(Operation example 3-1-2) Further time for tracking, AGC, etc., may be included.

(Operation example 3-2) “At least one of the other notification/reference signals” may be any of the following.

(Operation example 3-2-1) Downlink control channel such as PDCCH (Operation example 3-2-2) Downlink synchronous signal/notification channel such as SSB (Operation example 3-2-3) Downlink reference signal such as CSI-RS, TRS (3.6) Operation Example 4

(Operation example 4) A terminal may report as capability information on Capability for at least one of the supportability of a monitoring operation in an ultra-narrow band resource and the supportability of each associated parameter.

(Operation example 4-1) The supportability of a monitoring operation in an ultra-narrow band resource may be reported as one or a combination of the following (Operation example 4-1-1) Per UE, Per band, Per FR, Per Duplex mode (Operation example 4-2) The following capability information for monitoring operations on very narrow band resources may be reported (Operation example 4-2-1) Monitoring period (interval) and period (Operation example 4-2-2) Number of monitoring resources (or number of concurrent monitoring carriers with ultra-narrow band resources)

(3.7) Operation Example 5

(Operation Example 5) Inter-user Multiplexing of Ultra-Narrow Band Resources

Ultra-narrow band resources monitored by different users may be one or a combination of TDM, FDM, CDM and SDM, or shared by multiple users.

(3.8) Operation Example 6

Example 6

Symbol length on ultra-narrow band resources

The same symbol length as that of any SCS supported by the terminal 200 may be used, or a different symbol length (e.g., a longer symbol length) from that of the SCS supported by the terminal may be used.

(4) Operational Effects

According to the above described embodiment, the following working effects can be obtained. Specifically, a terminal (UE 200) is equipped with a control unit (control unit 240) that sets a bandwidth resource narrower than the normal minimum unit when a specific condition is met or a specific notification is received, and a reception unit (radio communication unit 210) that performs receiving operation including monitoring with the set bandwidth resource.

Therefore, in B5G/6G, where the inactivity time is assumed to be very long, by making the bandwidth narrower than the minimum unit, power consumption can be suppressed and a long standby time can be realized.

In this embodiment, a specific notification is a notification from a base station (gNB 100) about the allocation of narrowband resources.

Therefore, it is possible to enter the standby mode for a long time at the appropriate timing and frequency range allocated from the base station (gNB 100).

In this embodiment, a band narrower than the normal minimum unit (ultra-narrow band) is less than one resource block or one or several subcarriers.

Therefore, power consumption can be further suppressed by performing the receiving operation in a band smaller than the usual minimum unit (one resource block).

In the present embodiment, control unit (control unit 240) switches the configured narrowband resource to a wideband resource when another condition is satisfied or when another specific notification is received.

Therefore, the normal mode can be restored at an appropriate time.

In this embodiment, the base station is further provided with a transmission unit (radio communication unit 210) that transmits capability information to the base station 100 regarding the ability to set bandwidth resources narrower than the normal minimum unit.

Therefore, the base station 100 can ascertain whether or not the terminal supports an ultra-narrow band or the like.

The base station (gNB 100) is also equipped with a control unit (140) that allocates narrower bandwidth resources than the usual minimum unit to the terminal (UE 200) and a transmission unit (radio communication unit 110) that sends a notification regarding the narrower bandwidth resource allocation to the terminal (UE 200).

For this reason, in the B5G/6G where the inactivity time is assumed to be very long, the UE 200 can realize a long standby time by narrowing the bandwidth and suppressing power consumption at an appropriate time.

(5) Other Embodiments

Although the above description of the embodiment is not limited to the description of the embodiment, it is obvious to those skilled in the art that various modifications and improvements are possible.

In the above described embodiment, an example of receiving operation for monitoring application was described, but it is not limited to this, and data receiving operation for low-dose data communication for the Internet of Things (IoT) may be performed.

In addition, the block diagram (FIGS. 2 and 3) used for the description of the above described embodiment shows a block for each functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that makes transmission work is called a transmitting unit (transmission unit) or transmitter. In either case, as described above, the implementation method is not particularly limited.

Figure 7:
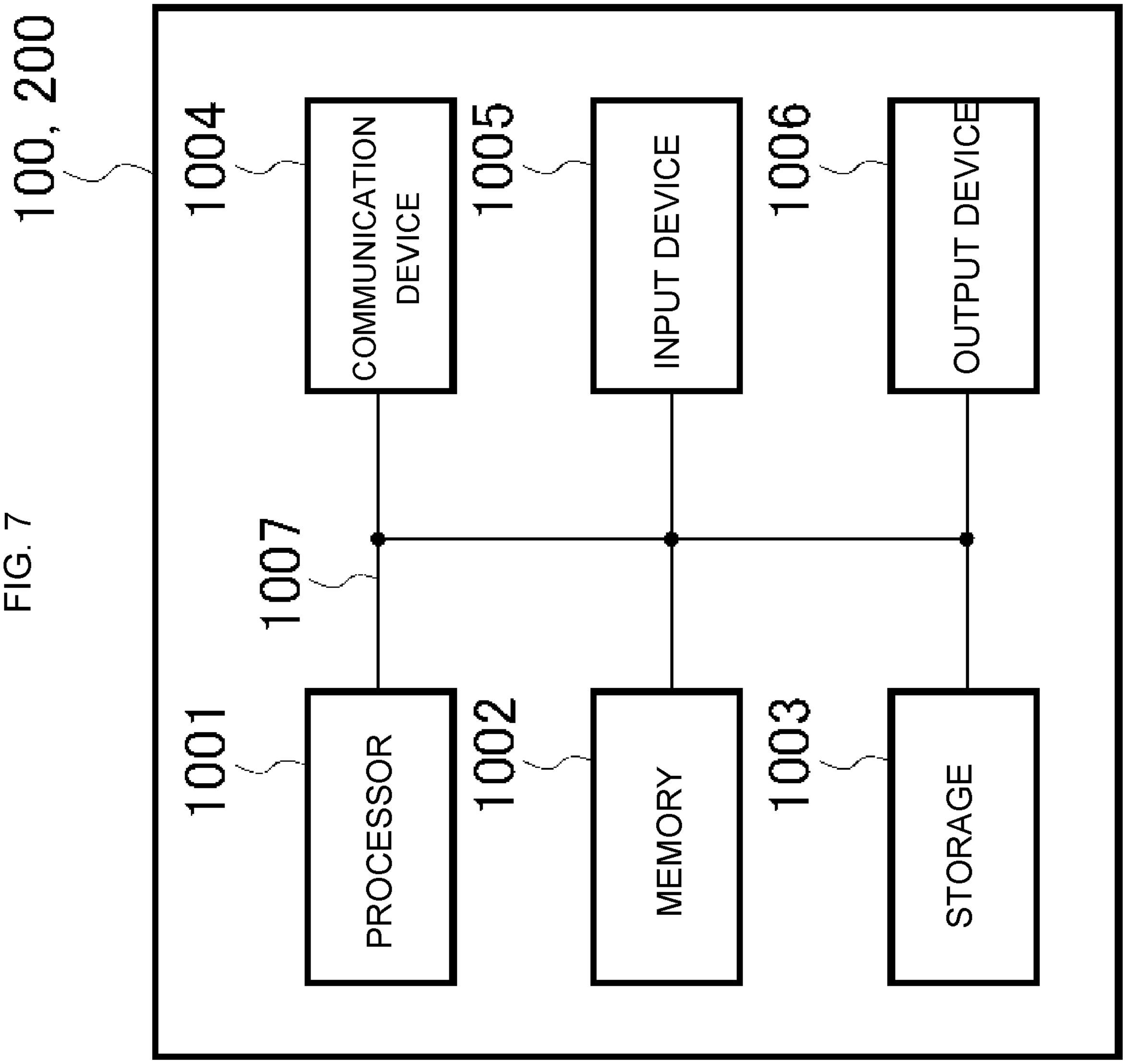
FIG. 7 shows an example of the hardware configuration of the UE 200.

In addition, the base station 100 or the UE 200 described above may function as a computer for processing the radio communication method of this disclosure. FIG. 7 shows an example of the hardware configuration of the base station 100 or the UE 200. As shown in FIG. 7, the base station 100 or the UE 200 may be configured as a computer device including a processor 1001, a memory 1002, a storage 1003, a communication device 1004, an input device 1005, an output device 1006 and a bus 1007, etc.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the UE 200 (see FIG. 3) is realized by any hardware element of the computer device or a combination of the hardware elements.

Each function of the UE 200 is realized by loading prescribed software (programs) on hardware such as the processor 1001, the memory 1002, etc., so that the processor 1001 performs operations and controls communication by communication device 1004 or at least one of reading and writing data in the memory 1002 and the storage 1003.

The processor 1001, for example, operates an operating system to control the entire computer. The processor 1001 may consist of a central processing unit (CPU) including interfaces with peripheral devices, controllers, arithmetic units, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, etc. Memory 1002 may store programs (program code), software modules, etc., that are capable of executing a method according to one embodiment of this disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device such as a processor 1001 and a memory 1002 is connected by a bus 1007 for communicating information. The bus 1007 may be configured using a single bus or different buses for each device.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

In addition, notification of information is not limited to the mode/embodiment described in this disclosure and may be made using other methods. For example, notification of information may be carried out by physical layer signaling (e.g., Downlink Control Information (DCI), Uplink Control Information (UCI), higher layer signaling (e.g., RRC signaling, Medium Access Control (MAC) signaling, notification information (Master Information Block (MIB), System Information Block (SIB)), other signals or a combination thereof. Also, RRC signaling may be referred to as RRC messages, for example, RRC Connection Setup messages, RRC Connection Reconfiguration messages, etc.

Each aspect/embodiment described in this disclosure may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), systems utilizing other suitable systems and next-generation systems based on them (such as B5G/6G). Further, a plurality of systems may be combined (for example, a combination of at least one of the LTE and the LTE-A with the 5G).

The processing procedures, sequences, flowcharts, etc., of each mode/embodiment described in this disclosure may be reordered as long as there is no conflict. For example, the method described in this disclosure uses an illustrative order to present elements of various steps and is not limited to the specific order presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in this disclosure may be used alone, in combination, or switched over as practice progresses. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channels and symbols may be a signal (signaling). Also, the signal may be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)," "user terminal," "user equipment (User Equipment: UE)," "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, airplanes, etc.), an unmanned mobile body (For example, drones, self-driving cars, etc.) or a robot (manned or unmanned). At least one of a base station and a mobile station can be a device that does not necessarily move during the communication operation. For example, at least one of a base station and a mobile station may be an Internet of Things (IoT) device such as a sensor.

The base station in this disclosure may also be read as a mobile station (user terminal, hereinafter the same). For example, each mode/embodiment of this disclosure may be applied to a configuration in which communication between a base station and a mobile station is replaced with communication between multiple mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, mobile stations in this disclosure may be replaced with base stations. In this case, the base station may have the function of the mobile station. A radio frame may be composed of one or more frames in the time domain. Each frame or frames in the time domain may be referred to as a subframe. A subframe may be further configured by one or more slots in the time domain. Subframes may have a fixed length of time (For example, 1 ms) independent of numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. A PDSCH (or PUSCH) transmitted in units of time larger than a minislot may be called a PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the subframes and TTI may be a subframe (1 ms) in an existing LTE, may have a duration shorter than 1 ms (For example, 1-13 symbols), or may have a duration longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. In addition, the number of slots (number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be identified by an index of RBs relative to the common reference point of the carrier. PRB may be defined in BWP and numbered within that BWP.

BWP may include UL BWP (UL BWP) and DL BWP (DL BWP). One or a plurality of BWPs may be configured in one carrier for the UE.

At least one of the configured BWPs may be active, and the UE may not expect to send and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected," "coupled," or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access." In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to an element using a designation such as "first," "second," and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include," "including," and variants thereof are intended to be inclusive in a manner similar to the term "comprising." Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" and "determination" may include regarding some action as "judgment" and "determination." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 radio communication system
20 NG-RAN
100 gNB
200 UE
1001 processor
1002 memory
1003 storage
1004 communication device
1005 input device
1006 output device
1007 bus

The invention claimed is:

1. A terminal comprising:
- a processor that configures bandwidth resources narrower than a normal minimum unit when a specific condition is met;
- in a case where a specified period of time elapses in which instruction to send or receive data is not received, the processor configures the bandwidth resources narrower than a normal minimum unit;
- in a case where instruction to enter a Discontinuous Reception (DRX) state is received, the processor configures the bandwidth resources narrower than a normal minimum unit;
- in a case where instruction to send or receive data is received after the terminal enters the DRX state, the processor configures the bandwidth resources narrower than a normal minimum unit;
- in a case where the terminal enters an IDLE state, the processor configures the bandwidth resources narrower than a normal minimum unit; and
- a transceiver that performs reception operation including monitoring on the bandwidth resources configured.

2. The terminal according to claim 1, wherein the specific condition further includes receiving a notification from a base station related to allocation of the bandwidth resources narrower than a normal minimum unit.

3. The terminal according to claim 2, wherein the bandwidth narrower than the normal minimum unit is less than one resource block or one or more subcarriers.

4. The terminal according to claim 2, further comprising a transceiver that transmits capability information to a base station related to capability of configuring bandwidth resources narrower than the normal minimum unit.

5. The terminal according to claim 1, wherein the bandwidth narrower than the normal minimum unit is less than one resource block or one or more subcarriers.

6. The terminal according to claim 5, wherein the processor switches from the configured narrower bandwidth resources to wider bandwidth resources when other condition is satisfied.

7. The terminal according to claim 5, further comprising a transceiver that transmits capability information to a base station related to capability of configuring bandwidth resources narrower than the normal minimum unit.

8. The terminal according to claim 1, wherein the processor switches from the configured narrower bandwidth resources to wider bandwidth resources when other condition is satisfied.

9. The terminal according to claim 8, further comprising a transceiver that transmits capability information to a base station related to capability of configuring bandwidth resources narrower than the normal minimum unit.

10. The terminal according to claim 1, further comprising a transceiver that transmits capability information to a base station related to capability of configuring bandwidth resources narrower than the normal minimum unit.

11. A base station comprising:
- a processor that allocates bandwidth resources narrower than a normal minimum unit to a terminal when a specific condition is met;
- in a case where a specified period of time elapses in which instruction to send or receive data is not transmitted, the processor allocates the bandwidth resources narrower than a normal minimum unit;
- in a case where instruction to enter a Discontinuous Reception (DRX) state is transmitted, the processor allocates the bandwidth resources narrower than a normal minimum unit;
- in a case where instruction to send or receive data is transmitted after the terminal enters the DRX state the processor allocates the bandwidth resources narrower than a normal minimum unit;
- in a case where the terminal enters an IDLE state, the processor allocates the bandwidth resources narrower than a normal minimum unit; and
- a transceiver that transmits a notification related to allocation of the narrower bandwidth resources to the terminal.

12. A communication method of a terminal, comprising:
- configuring bandwidth resources narrower than a normal minimum unit when a specific condition is met;
- in a case where a specified period of time elapses in which instruction to send or receive data is not received, configuring the bandwidth resources narrower than a normal minimum unit;
- in a case where instruction to enter a Discontinuous Reception (DRX) state is received, configuring the bandwidth resources narrower than a normal minimum unit;
- in a case where instruction to send or receive data is received after the terminal enters the DRX state, configuring the bandwidth resources narrower than a normal minimum unit;
- in a case where the terminal enters an IDLE state, configuring the bandwidth resources narrower than a normal minimum unit; and
- performing reception operations including monitoring on the bandwidth resources configured.

13. A communication method of a base station, comprising:

allocating bandwidth resources narrower than a normal minimum unit to a terminal when a specific condition is met;

in a case where a specified period of time elapses in which instruction to send or receive data is not transmitted, allocating the bandwidth resources narrower than a normal minimum unit;

in a case where instruction to enter a Discontinuous Reception (DRX) state is transmitted, allocating the bandwidth resources narrower than a normal minimum unit;

in a case where instruction to send or receive data is transmitted after the terminal enters the DRX state, allocating the bandwidth resources narrower than a normal minimum unit;

in a case where the terminal enters an IDLE state, allocating the bandwidth resources narrower than a normal minimum unit; and transmitting a notification related to allocation of the narrower bandwidth resources to the terminal.

* * * * *